US012754920B2

(12) United States Patent
Hane

(10) Patent No.: US 12,754,920 B2
(45) Date of Patent: Oct. 6, 2026

(54) SYSTEMS AND METHODS FOR MODEL COMPARISON AND EVALUATION

(71) Applicant: UnitedHealth Group Incorporated, Minnetonka, MN (US)

(72) Inventor: Christopher A. Hane, Irvine, CA (US)

(73) Assignee: UnitedHealth Group Incorporated, Minnetonka, MN (US)

( * ) Notice: Subject to any disclaimer, the term of this patent is extended or adjusted under 35 U.S.C. 154(b) by 441 days.

(21) Appl. No.: 18/050,613

(22) Filed: Oct. 28, 2022

(65) Prior Publication Data

US 2024/0143602 A1 May 2, 2024

(51) Int. Cl.
*G06F 16/2457* (2019.01)

(52) U.S. Cl.
CPC .............................. *G06F 16/24578* (2019.01)

(58) Field of Classification Search
CPC ................................................ G06F 16/24578
USPC ......................................................... 707/748
See application file for complete search history.

(56) References Cited

U.S. PATENT DOCUMENTS 10,726,359 B1 7/2020 Drouin et al.
11,238,469 B1 2/2022 Talvola et al.
2009/0271371 A1* 10/2009 Levin ...................... G06F 16/29
2017/0060988 A1 3/2017 Kudo et al.
2019/0066109 A1* 2/2019 Jia .......................... G06Q 40/02
2020/0357388 A1* 11/2020 Zhao ........................ G06N 3/08
2020/0372472 A1* 11/2020 Kenthapadi ....... G06F 16/24578
2021/0043043 A1* 2/2021 Burns ................... G07F 17/323
2021/0174222 A1* 6/2021 Dodwell .................. G06N 5/04
2022/0012591 A1* 1/2022 Dalli ...................... G06N 3/082
2023/0177441 A1* 6/2023 Durvasula ................ G06N 3/08
706/45
2023/0252336 A1* 8/2023 Mele ...................... G06N 20/00
706/12

(Continued)

OTHER PUBLICATIONS

Belkin et al., "Combining the evidence of multiple query representations for information retrieval," Information Processing & Management, vol. 31, No. 3, pp. 431-448, 1995. Retrieved from http://kantor.comminfo.rutgers.edu/CURRIC.VITAE/CV%20PDFs/multiquery.pdf.

(Continued)

*Primary Examiner* — Boris Gorney
(74) *Attorney, Agent, or Firm* — Bookoff McAndrews, PLLC

(57) ABSTRACT

Systems and methods are disclosed for comparing a plurality of models. The method includes generating raw scores for the plurality of models based on multiple measures of demographic bias and performance. The raw scores for each of the plurality of models are stored in corresponding locations of a raw score matrix. The rank scores for the plurality of models are determined based on comparing the raw scores of the plurality models in each of the multiple measures of demographic bias and performance. The rank scores for each of the plurality of models are stored in corresponding locations of a rank matrix. Tournament scores for the plurality of models are determined based on performing a pairwise comparison of the rank scores. The tournament scores are stored in corresponding locations of a tournament matrix. The tournament scores are tallied to determine a rank for each of the plurality of models.

20 Claims, 8 Drawing Sheets

(56) References Cited

U.S. PATENT DOCUMENTS

2023/0282018 A1* 9/2023 Basu ...................... G06N 20/00
382/181

OTHER PUBLICATIONS

Dwork et al., "Rank aggregation methods for the web," 10th International Conference on World Wide Web, pp. 613-622, 2001. Retrieved from https://galton.uchicago.edu/~lekheng/meetings/mathofranking/ref/kumar.pdf.

Sen, "Collective choice and social welfare," Harvard University Press, 2017.

* cited by examiner

301

| RAW SCORE MATRIX 205 | MODEL 1 | MODEL 2 | MODEL 3 |
|---|---|---|---|
| CRITERION 1 - PRECISION | 0.75 | 0.85 | 0.95 |
| CRITERION 2 - RECALL | 0.92 | 0.93 | 0.66 |
| CRITERION 3 - TRANSPARENCY | 2 | 3 | 1 |
| CRITERION 4 – DOLLARS SAVED | $100,000 | $200,000 | $150,000 |

FIG. 3A

303

| RANK MATRIX 207 | MODEL 1 | MODEL 2 | MODEL 3 |
|---|---|---|---|
| CRITERION 1 - PRECISION | 3 | 2 | 1 |
| CRITERION 2 - RECALL | 1 | 1 | 3 |
| CRITERION 3 - TRANSPARENCY | 2 | 1 | 3 |
| CRITERION 4 – DOLLARS SAVED | 3 | 1 | 2 |
| TOTAL | 9 | 5 | 9 |

305

*FIG. 3B*

| TOURNAMENT MATRIX 209 | MODEL 1 | MODEL 2 | MODEL 3 | TOTAL |
|---|---|---|---|---|
| MODEL 1 | X | 0 | 0 | 0 |
| MODEL 2 | 1 | X | 1 | 2 |
| MODEL 3 | 1 | 0 | X | 1 |

FIG. 3C

SYSTEMS AND METHODS FOR MODEL COMPARISON AND EVALUATION

FIELD OF DISCLOSURE

The present disclosure relates generally to the technical field of machine learning, and more particularly, to systems and methods for model comparison and evaluation using a voting tournament matrix.

BACKGROUND

Machine learning models are trained over large datasets to produce an output with high precision and accuracy. However, machine learning systems are susceptible to unintended bias, e.g., demographic bias, resulting in unfair and discriminatory algorithms that may adversely impact the outcome. The presence of demographic bias in the models being evaluated poses several challenges, including: (i) there are numerous different measures to measure demographic bias, and there is no theoretical limit to the number of measures of demographic bias, (ii) the output of different bias criteria yield scores that are not comparable to one another, (iii) it is difficult to get a score that is indicative of the best performance in all the bias criteria because scoring higher in one criterion may result in reduced performance in another, and (iv) the importance of a bias criterion may depend on the context in which it is used, and there is a lack of agreement regarding identifying the most important bias criterion.

The techniques of this disclosure may solve one or more of the problems set forth above and/or other problems in the art by comparing and evaluating a plurality of models according to multiple measures of demographic bias and model performance. The scope of the current disclosure, however, is defined by the attached claims, and not by the ability to solve any specific problem. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

In one embodiment, a computer-implemented method for comparing a plurality of models is disclosed. The computer-implemented method includes: generating raw scores for the plurality of models based on multiple measures of demographic bias and performance, wherein each of the raw scores is associated with a corresponding model of the plurality of models and a corresponding measure of the multiple measures of demographic bias and performance; storing the raw scores for each of the plurality of models in corresponding locations of a raw score matrix, wherein each of the locations of the raw score matrix is associated with a corresponding measure of the multiple measures of demographic bias and performance and a corresponding model of the plurality of models; determining rank scores for the plurality of models with respect to the multiple measures of demographic bias and performance, the determining based on comparing the raw scores of the plurality models in each of the multiple measures of demographic bias and performance; storing the rank scores for each of the plurality of models in corresponding locations of a rank matrix, wherein each of the locations of the rank matrix is associated with a corresponding measure of the multiple measures of demographic bias and performance and a corresponding model of the plurality of models; determining tournament scores for the plurality of models based on a pairwise comparison of the rank scores of the plurality of models; storing the tournament scores in corresponding locations of a tournament matrix, wherein each of the locations of the tournament matrix is associated with a corresponding model of the plurality of models and represents a win, a loss, or a draw against another model of the plurality of models; determining a rank for each of the plurality of models based on tallying the tournament scores of the tournament matrix; and selecting and presenting at least one least biased model to a user via a user interface.

In accordance with another embodiment, a system for comparing a plurality of models is disclosed. The system includes one or more processors, and at least one non-transitory computer readable medium storing instructions which, when executed by the one or more processors, cause the one or more processors to perform operations including: generating raw scores for the plurality of models based on multiple measures of demographic bias and performance, wherein each of the raw scores is associated with a corresponding model of the plurality of models and a corresponding measure of the multiple measures of demographic bias and performance; storing the raw scores for each of the plurality of models in corresponding locations of a raw score matrix, wherein each of the locations of the raw score matrix is associated with a corresponding measure of the multiple measures of demographic bias and performance and a corresponding model of the plurality of models; determining rank scores for the plurality of models with respect to the multiple measures of demographic bias and performance, the determining based on comparing the raw scores of the plurality models in each of the multiple measures of demographic bias and performance; storing the rank scores for each of the plurality of models in corresponding locations of a rank matrix, wherein each of the locations of the rank matrix is associated with a corresponding measure of the multiple measures of demographic bias and performance and a corresponding model of the plurality of models; determining tournament scores for the plurality of models based on a pairwise comparison of the rank scores of the plurality of models; storing the tournament scores in corresponding locations of a tournament matrix, wherein each of the locations of the tournament matrix is associated with a corresponding model of the plurality of models and represents a win, a loss, or a draw against another model of the plurality of models; determining a rank for each of the plurality of models based on tallying the tournament scores of the tournament matrix; and selecting and presenting at least one least biased model to a user via a user interface.

In accordance with a further embodiment, a non-transitory computer readable medium for comparing a plurality of models is disclosed. The non-transitory computer readable medium stores instructions which, when executed by one or more processors, cause the one or more processors to perform operations including: generating raw scores for the plurality of models based on multiple measures of demographic bias and performance, wherein each of the raw scores is associated with a corresponding model of the plurality of models and a corresponding measure of the multiple measures of demographic bias and performance; storing the raw scores for each of the plurality of models in corresponding locations of a raw score matrix, wherein each of the locations of the raw score matrix is associated with a corresponding measure of the multiple measures of demographic bias and performance and a corresponding model of the plurality of models; determining rank scores for the plurality of models with respect to the multiple measures of demographic bias and performance, the determining based on comparing the raw scores of the plurality models in each of the multiple measures of demographic bias and performance; storing the rank scores for each of the plurality of models in corresponding locations of a rank matrix, wherein each of the locations of the rank matrix is associated with a corresponding measure of the multiple measures of demographic bias and performance and a corresponding model of the plurality of models; determining tournament scores for the plurality of models based on a pairwise comparison of the rank scores of the plurality of models; storing the tournament scores in corresponding locations of a tournament matrix, wherein each of the locations of the tournament matrix is associated with a corresponding model of the plurality of models and represents a win, a loss, or a draw against another model of the plurality of models; determining a rank for each of the plurality of models based on tallying the tournament scores of the tournament matrix; and selecting and presenting at least one least biased model to a user via a user interface.

It is to be understood that both the foregoing general description and the following detailed description are exemplary and explanatory only and are not restrictive of the detailed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 3A illustrates an example of raw score matrix 205, according to aspects of the disclosure.

FIG. 3B illustrates an example of rank matrix 207, according to aspects of the disclosure.

FIG. 3C illustrates an example of tournament matrix 209 and a resulting tally, according to aspects of the disclosure.

DETAILED DESCRIPTION

Figure 1:
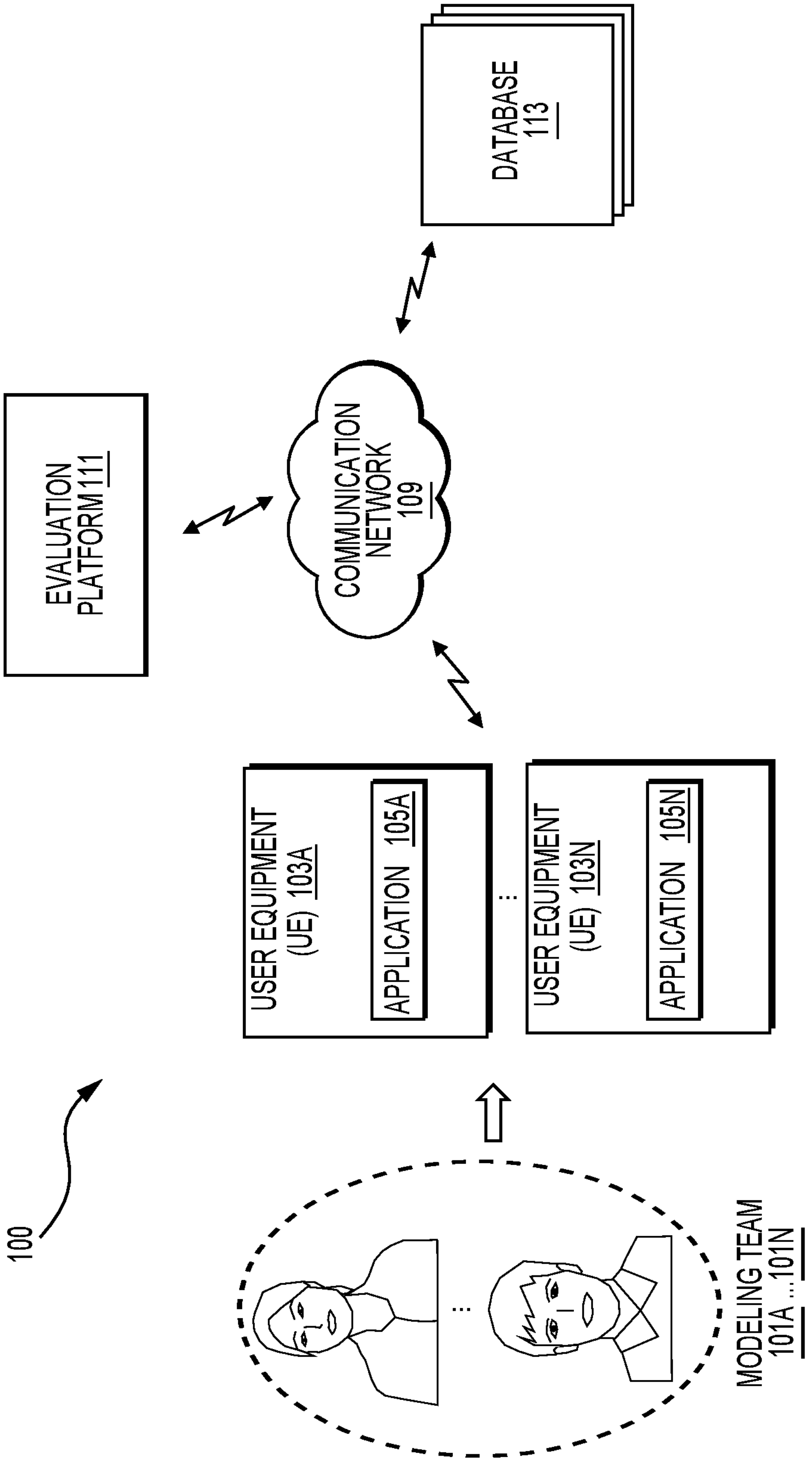
FIG. 1 is a diagram of a system capable of comparing and evaluating a plurality of models according to multiple measures of demographic bias and performance for selecting a least biased model, according to aspects of the disclosure.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description.

Various non-limiting embodiments of the present disclosure will now be described to provide an overall understanding of the principles of the structure, function, and use of systems and methods disclosed herein for comparing and evaluating a plurality of models according to multiple measures of demographic bias and performance for selecting a least biased model.

With the widespread use of machine learning systems in everyday lives, accounting for fairness has gained significant importance in designing and engineering such systems. Machine learning systems may be used to make important decisions, thus it is crucial to ensure that these decisions do not reflect discriminatory behavior toward a certain group of users. There are clear benefits to algorithmic decision-making, however, algorithms are vulnerable to biases that render their decisions unfair. Bias may be created in several ways, for example, bias may be created unconsciously due to lack of data (sparse training data), imbalanced training data, an algorithmic error that may cause the machine learning systems to be sensitive to noise or unknown data, and/or systemic errors and other sources of errors that may skew and bias the resulting models.

In one example embodiment, models may be evaluated by a set of evaluation functions. The evaluation functions may be numeric, such as (i) global measures, e.g., AUC-ROC, PR-AUC; (ii) threshold measures, e.g., true positive rate, false positive rate, true negative rate, false negative rate, top 1% of highest scores, top 2%, etc., (iii) run time measures, and/or (iv) the number of data inputs. In one embodiment, the evaluations may be ordered categories, such as (i) complexity of the model algorithm, e.g., rules<regression<generalized linear model<boosted model<DL; (ii) model transparency as any pre-specified list of methods or methods with inputs. These categories may be ordered 1, . . . , N to favor simplicity or transparency. However, it is technically challenging to include interpretability, execution time, and all the performance measures in a single evaluation. The aggregation of different measures of model performance is a key issue for model deployment. There may be situations when there is no clear single evaluation criterion to select a model. In terms of equity of outcomes, there may not be a single evaluation criterion that captures all the tradeoffs among the different criteria, e.g., there is no simple way to compare model fairness in one race or protected group to other protected groups.

Machine learning systems are data-driven and if the training data contains biases, the algorithms will learn them and reflect those biases in the prediction. In some cases, algorithms may even magnify the biases and may generate a misleading outcome. Machine learning systems may find it challenging to compare models using multiple evaluation criteria which are not comparable to one another. Beyond simply achieving model comparison, machine learning systems experience technical difficulties in comparing models in a robust way and yield model rankings that are generalizable to new data inputs. In addition, machine learning systems are continuously challenged to rank models according to continuous measures while avoiding rank order differences that are disproportionate to minor differences in the continuous measure.

To address these problems, system 100 of FIG. 1 introduces the capability to compare and evaluate a plurality of models according to multiple measures of demographic bias and performance (e.g., model performance) for selecting a least biased model over other candidates. In one embodiment, system 100 may generate a raw score matrix based on multiple measures of demographic bias and performance.

The raw score matrix may be utilized to create a rank matrix. The values in the rank matrix may be processed to determine the values of a tournament matrix, and the results of the tournament matrix may be tallied to determine a model that performs best overall under the evaluation criteria, e.g., a least biased model. Further details of these evaluation criteria are provided below.

FIG. 1 introduces a capability to implement modern communication and data processing capabilities into methods and systems for comparing and evaluating a plurality of models based on bias, e.g., demographic bias, and performance, e.g., computational complexity. FIG. 1, an example architecture of one or more example embodiments of the present invention, includes system 100 that comprises modeling team 101*a*-101*n* (collectively referred to as modeling team 101), user equipment (UE) 103*a*-103*n* (collectively referred to as UE 103) that includes application 105*a*-105*n* (collectively referred to as application 105), communication network 109, evaluation platform 111, and database 113.

Modeling team 101, e.g., software engineers, developers, data architects, etc., may build a single model to compare to a baseline (A/B test), or a candidate list of models. Comparison and evaluation of the model performance and demographic bias may be performed on a training data set. Modeling team 101 may gather and prepare training data, e.g., raw data, from multiple sources. Once collected, modeling team 101 may determine crucial attributes of the data that are good indicators of the outcome the model is predicting. During model development, modeling team 101 may iteratively improve data cleaning, feature engineering, and/or model fit choices where each step may create a new baseline performance. The quality of the evaluation at each iteration may ensure the quality of the result. Alternatively, a review/audit team 101 may apply model diagnostics and accuracy measures to determine model risks. The models in the candidate set may be similar in that they apply to the same dataset, but may be any mix of rules, e.g., machine learning, artificial intelligence, or other algorithms.

UE 103 may include, but is not restricted to, any type of a mobile terminal, wireless terminal, fixed terminal, or portable terminal utilized by modeling team 101. Examples of the UE 103, may include, but are not restricted to, a mobile handset, a wireless communication device, a station, a unit, a device, a multimedia computer, a multimedia tablet, an Internet node, a communicator, a desktop computer, a laptop computer, a notebook computer, a netbook computer, a tablet computer, a Personal Communication System (PCS) device, a personal navigation device, a Personal Digital Assistant (PDA), a digital camera/camcorder, an infotainment system, a dashboard computer, a television device, or any combination thereof, including the accessories and peripherals of these devices, or any combination thereof. In addition, the UE 103 may facilitate various input means for receiving and generating information, including, but not restricted to, a touch screen capability, a keyboard, and keypad data entry, a voice-based input mechanism, and the like. Any known and future implementations of the UE 103 may also be applicable.

In one embodiment, applications 105 may include various applications such as, but not restricted to, content provisioning applications, networking applications, multimedia applications, media player applications, camera/imaging applications, software applications, and the like. In one embodiment, one of the applications 105 at UE 103 may act as a client for evaluation platform 111 and may perform one or more functions associated with the functions of evaluation platform 111 by interacting with evaluation platform 111 over communication network 109.

In one embodiment, various elements of system 100 may communicate with each other through communication network 109. Communication network 109 may support a variety of different communication protocols and communication techniques. In one embodiment, communication network 109 allows evaluation platform 111 to communicate with UE 103, and database 113. The communication network 109 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular communication network and may employ various technologies including 5G (5th Generation), 4G, 3G, 2G, Long Term Evolution (LTE), wireless fidelity (Wi-Fi), Bluetooth®, Internet Protocol (IP) data casting, satellite, mobile ad-hoc network (MANET), vehicle controller area network (CAN bus), and the like, or any combination thereof.

In one embodiment, evaluation platform 111 may be a platform with multiple interconnected components. Evaluation platform 111 may include one or more servers, intelligent networking devices, computing devices, components, and corresponding software for comparing and evaluating a plurality of models according to multiple measures of demographic bias and performance for selecting a least biased model over other candidates. In addition, it is noted that evaluation platform 111 may be a separate entity of system 100.

In one embodiment, evaluation platform 111 may quantify the performance of a model using different model evaluation metrics, e.g., precision, recall, transparency, etc. In one example embodiment, model evaluations may be fairness measures. To determine model fairness, evaluation platform 111 may evaluate model performance on important subsets of data, e.g., race, gender, age, etc., or surrogates for the sensitive attributes. The evaluation set can use each of the measures independently, or an evaluation function could be maximum difference in the measure across the subsets/groups. However, selecting a single measure for evaluation may not be sufficient for certain use cases, including healthcare. Instead, it may be desirable to use a holistic set of evaluation measures in selecting a least biased model (or a model with the best overall performance). For example, if models are candidates and evaluation measures each have a vote, evaluation platform 111 may use voting theory to decide on a best or equally good set of models. A common way to vote for a winning candidate is to use a pairwise tournament between all pairs of candidates, i.e., models. For example, if model J beats all other models in the tournament, then model J is best.

In one example embodiment, there are K evaluation measures (K voters), and M models. Evaluation platform 111 may create a matrix of M rows and K columns with the evaluation data for each model. Each cell is the value the voter assigns to the candidate. The tournament is an M×M matrix with the winner of each pairwise evaluation. Evaluation platform 111 may use the evaluation matrix to determine if model I beats model J, e.g., if more voters prefer model I to model J, or a tie. For example, I, J cell value may be 3 points if I beats J, 1 for a tie, and 0 if J beats I, however, other values may be used. Evaluation platform 111 may decide how large an evaluation difference determines a win, e.g., <=2% difference in the area under the curve (AUC) is a tie. The row sum of the tournament matrix is the value of each model, and the winner is the model with the maximum row sum.

In one embodiment, evaluation platform 111 may measure each evaluation criterion against N bootstrap samples of the validation data yielding essentially N times more evaluations, or may compare the confidence intervals from two models to determine a winner. The voting itself may be checked with leave-one-out validation, or other sampling of the evaluation criteria. This may check for over-dependence on a single criteria. Further details of evaluation platform 111 and the model evaluation techniques are discussed below.

In one embodiment, database 113 may be any type of database, such as relational, hierarchical, object-oriented, and/or the like, that may store the plurality of models developed by modeling team 101. In another embodiment, database 113 may include a dataset that includes data collections that are not subject-specific, i.e., data collections based on population-wide observations, local, regional or super-regional observations, and the like to aid in the content provisioning and sharing process. In one example embodiment, modeling team 101 may query database 113 to access various information, e.g., demographic data, etc., to develop the models. In another embodiment, various components of evaluation platform 111 may query database 113 to access the plurality of models for processing. In a further example embodiment, evaluation platform 111 may access database 113 to access the best model, e.g., a least biased model, for presentation in a user interface of UE 103.

By way of example, UE 103, evaluation platform 111, and database 113 may communicate with each other and other components of the communication network 109 using well known, new or still developing protocols. In this context, a protocol includes a set of rules defining how the network nodes within the communication network 109 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
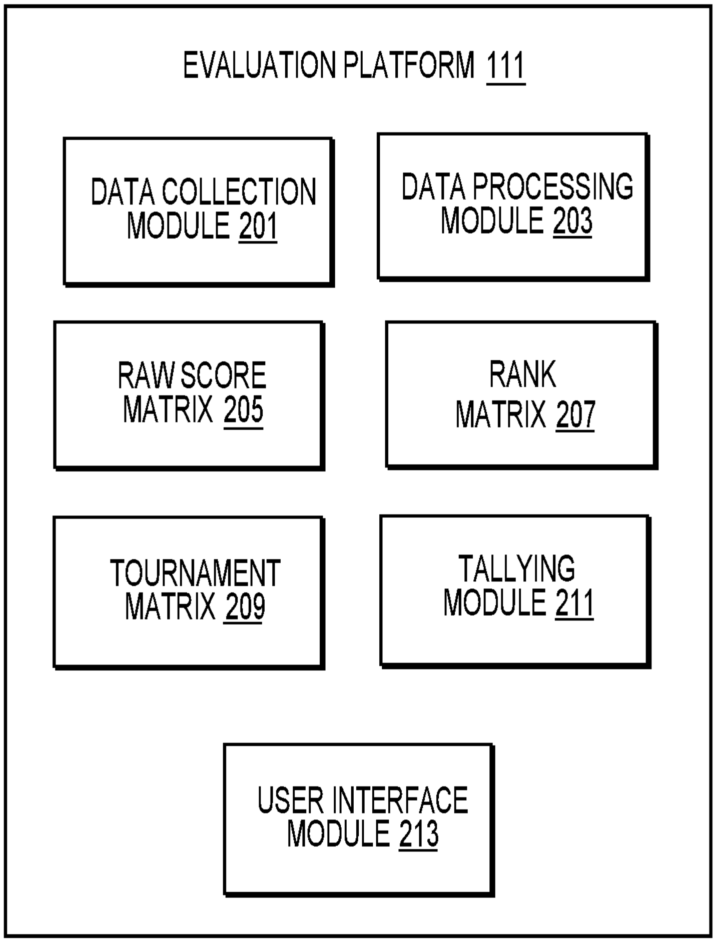
FIG. 2 is a diagram of the components of evaluation platform 111, according to aspects of the disclosure.

FIG. 2 is a diagram of the components of evaluation platform 111, according to one example embodiment. As used herein, terms such as "component" or "module" generally encompass hardware and/or software, e.g., that a processor or the like may use to implement associated functionality. By way of example, evaluation platform 111 includes one or more components for comparing a plurality of models by evaluating their performances on multiple measures of bias for selecting at least one least biased model over other candidates. It is contemplated that the functions of these components may be combined in one or more components or performed by other components of equivalent functionality. In one embodiment, evaluation platform 111 comprises data collection module 201, data processing module 203, raw score matrix 205, rank matrix 207, tournament matrix 209, tallying module 211, user interface module 213, or any combination thereof.

In one embodiment, data collection module 201 may collect relevant data through various data collection techniques to assist modeling team 101 in constructing a dataset for exploration and modeling. In one example embodiment, data collection module 201 may collect primary data, e.g., raw data, directly from first-hand sources through experiments, surveys, or observations. In one example embodiment, data collection module 201 may use a web-crawling component to access various databases or other information sources to collect relevant data. In one embodiment, data collection module 201 may include various software applications, e.g., data mining applications in Extended Meta Language (XML), that automatically search for and return relevant data. Data collection module 201 may parse and arrange the data into a common format that can be easily processed by other modules and platforms.

In one embodiment, data processing module 203 may process data collected by data collection module 201, e.g., raw data, and convert them into a machine-readable format for model generation. In one example embodiment, data processing module 203 may translate data from an experiment or a survey into a form that may be manipulated to produce a set of statistics. This may involve coding, editing, data entry, and monitoring the whole data processing procedure. Such monitoring involves detecting and correcting errors in data, e.g., duplicate data, error codes, inconsistent data, etc., to produce a dataset that is error-free. In one embodiment, a model is a dataset to achieve a particular objective. For example, a model may be a set of rules, a set of data, a machine-learning model/algorithm, an artificial intelligence algorithm, or any other algorithm configured to provide an output or achieve an objective. Data processing module 203 may transmit the model to other modules of evaluation platform 111, e.g., raw score matrix 205, rank matrix 207, and tournament matrix 209, for further processing.

In one embodiment, raw score matrix 205 may include dimensions K by M, wherein K is the number of evaluation criteria (e.g., measures of demographic bias and performance) that may be used to compare each model and M is the number of models being compared. In one example embodiment, K criteria may be indicated as rows and M models may be indicated as columns (as depicted in FIG.

3A), however it is understood that rows and columns may be exchanged with no effect on the underlying process. Each entry in raw score matrix 205 is a value of one of the K criteria evaluating one of the M models. In this embodiment, two types of raw scores are entered into raw score matrix 205 that may be handled differently in some embodiments:

1. Objective Measures: The objective measures for evaluating the plurality of models include measures such as precision, recall, the ratio of true positives to false positives, and the like. It should be understood that any other measures may be implemented for evaluating the plurality of models. In one embodiment, objective measures may include any measure of model performance over which no two rational observers would disagree. While many of these measures may fall on a continuum between zero and one, continuity may not be a requirement of the measure nor is a scale from zero to one.
2. Subjective Quantitative Measures: In one embodiment, the subjective quantitative measures may be measures of model performance that are subjective but have been expressed as quantities. In one example embodiment, one of the evaluation criteria for the models may be transparency. There may be a consensus that a decision tree may be more transparent than logistic regression which, in turn, may be more transparent than an embedding matrix of a language model, such as Bidirectional Encoder Representations from Transformers (BERT). To represent such differences in transparency, the decision tree may be assigned a transparency value of 3, the logistic regression may be assigned a transparency value of 2, and the embedding matrix may be assigned a transparency value of 1. However, these values do not suggest that logistic regression is twice as transparent as the embedding matrix, as these values may be assigned arbitrarily to represent numerically that some types of models are more transparent than others.

FIG. 3A is an example of raw score matrix 205. In FIG. 3A, raw score matrix 205 compares three models (e.g., model 1, model 2, and model 3) according to four evaluation criteria (e.g., precision, recall, transparency, and dollars saved), so the K-by-M dimensions of raw score matrix 205 are 4 by 3. In one embodiment, evaluation criteria 1 and 2 (e.g., precision and recall) are objective continuous measures, evaluation criterion 3 (e.g., transparency) is a quantitative subjective measure, and evaluation criterion 4 (e.g., dollars saved by using the given model) is the product of the calculation, but is not on a scale between 0 and 1. It should be understood that any other evaluation criteria may be implemented by raw score matrix 205 for evaluating the plurality of models.

In one embodiment, raw score matrix 205 may comprise multiple values in each cell of table 301. For example, each evaluation criterion K may yield multiple values for each model. In this embodiment, the first value in each cell of the raw score matrix may be a measure of central tendency yielded by the evaluation criterion, and the second value in the cell may be a measure of the variation of the values yielded by the criterion. Additional values may describe the skewness or kurtosis of the evaluation criteria. In subsequent steps, the variation measure may be used to declare ties among raw scores, i.e. the measure of central tendency, that is not sufficiently different with respect to the variation of values leading to the measure of central tendency. In some embodiments, raw score matrix 205 may define a function in each cell where the function generates the evaluation value according to an empirical evaluation of the model.

Referring back to FIG. 2, in one embodiment, rank matrix 207 may have dimension K by M, and may compare the M models according to the K evaluation criteria. In this example embodiment, for each of the K evaluation criteria, the raw scores for the M models are compared to one another and assigned a rank relative to the raw scores of the other models. Rank matrix 207 may assign the lowest rank number, e.g., 1, to the highest raw score. However, the same outcome may be achieved by assigning the highest rank number to the highest raw score by pairing this ranking with subsequent rules giving preference to higher rank numbers rather than lower rank numbers. Subjective quantitative measures may be treated as rank orders without further transformation.

In one embodiment, rank matrix 207 may use ranking methods that may allow for ties when the raw scores (particularly the objective measures) are sufficiently close. In one embodiment, the raw scores may be rounded to a set number of significant digits, such rounding may make raw scores that differed slightly equivalent to one another. In one embodiment, rank matrix 207 may employ an overlap threshold as a function of variation in the scores for the evaluation criterion for allowing ties between the raw scores. Rank matrix 207 may use approximation and/or overlap criteria to allow for ties among differing raw scores in the creation of the rank order. For example, rank matrix 207 may employ a rule that if two raw scores differed by less than a given fraction or multiple of a measure of variation for the scores of that criterion, then the two raw scores should be ranked equivalently. As previously mentioned, some embodiments may incorporate a measure of variation in each cell of raw score matrix 205 as well as a measure of central tendency so that the measure of variation is readily available for assessment of whether two models should be ranked differently and reported as a tie. Examples of variation measures may include confidence intervals, standard deviations, and standard errors. In one embodiment, subjective quantitative measures may possess tied scores without additional methodology creating ties. FIG. 3B illustrates an example of rank matrix 207. FIG. 3B follows from the example of raw score matrix 205 illustrated in FIG. 3A. Similar to raw score matrix 205, rank matrix 207 may compare three models (e.g., model 1, model 2, and model 3) according to four evaluation criteria (e.g., precision, recall, transparency, and dollars saved), and may have dimensions of 4 by 3. In this example embodiment, a lower rank may correspond to greater model performance. In one embodiment, rank matrix 207 may employ a tie-creating ranking wherein two models with similar enough raw scores may be equivalently ranked. For example, rank matrix 207 may rank models 1 and 2 as first, i.e., 1, in evaluation criterion 2 because their raw scores were 0.92 and 0.93, respectively (refer to FIG. 3A). In one embodiment, rank matrix 207 may reverse the ordering of the models from the raw score ordering for evaluation criterion 3 because high transparency, e.g. a raw score of 3, is desirable and thus translates to lower rank order, i.e., 1, and vice versa. In one embodiment, for criterion 4, dollars saved is a positive performance attribute and thus higher savings translates to lower rank order, i.e., 1, and vice versa. Table 303 has an additional row 305 that displays the aggregate of the ranks, e.g., the sum of the ranks.

Referring back to FIG. 2, in one embodiment, tournament matrix 209 may have dimensions M by M where M is the number of models being compared. Tournament matrix 209 may compare each of the M models to each of the other M models in a pairwise fashion. In one example embodiment, each of the values in tournament matrix 209 may be determined by comparing the ranks received by the first of the models being compared (recorded in rank matrix 207) with the ranks received by the second of the models being compared (also recorded in rank matrix 207). If the first of the models in the pairwise comparison has an aggregate rank score associated with a higher value than the second aggregate rank score, that location in tournament matrix 209 may be assigned a score associated with "winners." In one embodiment, the value associated with a particular location in tournament Matrix 209 may be referred to as a tournament score. Conversely, if the first of the models in the pairwise comparison has an aggregate rank score associated with a lower value than the second aggregate rank score, that location in tournament matrix 209 may be assigned a score associated with "losers." On the other hand, if the aggregate rank scores of the two models are equal, the location in the tournament matrix 209 may be assigned a score associated with ties.

In one embodiment, tournament matrix 209 may use a statistical comparison of two random variables while computing a winner between the first model and the second model. For example, a t-test, e.g., U-test or Wilcoxon test, may be applied to the data about the random variables for the evaluation function of the two models to determine whether one model is better than the other. This determination of a winner in each cell of tournament Matrix 209 may not be the same as the ranking from the raw scores because in raw scores, if model A=B and model B=C, then A=C, but with probability tests, there is a lack of transitivity of the comparison (A=B and B=C, but A>C).

In one embodiment, there may be numerous ways in which tournament matrix 209 may be varied. Firstly, there may be different embodiments with respect to how the rank orders of the respective models are aggregated before the comparison. An aggregation of rank orders may be referred to as a rank score. Secondly, there may be different methods for determining the values associated with winners, losers, and ties. For example:

1. Weighted rank winner: With respect to comparing the two sets of rank orders (each associated with a respective model), one embodiment may add the ranks associated with each model and may declare the winner to be the model with the lower (or higher, if rank is expressed in preference of highest to lowest) sum of ranks. Alternatively, a similar outcome may be achieved by multiplying the ranks associated with each model (if the scoring system is compatible with multiplication) and comparing the resulting products. The method may weigh the ranks of some evaluation criteria more heavily than others to reflect the relative importance of the criteria. Weighting may take the form of coefficients in an additive aggregation or exponents in a multiplicative aggregation.
2. Assigning tournament score: In one embodiment, assigning values to tournament Matrix 209 may include: (i) assigning a value '1' to a matrix cell j, if first of the two models being compared, e.g., model j, is indicated as the winner and has an aggregate rank order greater than the second of the models, e.g., model k, (ii) assigning a value '0' to matrix cell j, if model j is indicated as the loser and has an aggregate rank order less than model k, and/or (iii) assigning a value of '0.5' if the two models are equal. In another embodiment, assigning values to tournament Matrix 209 may include: (i) assigning value '1' to the matrix if model j is the winner, (ii) assigning value '−1' to the matrix if model j is the loser, and/or (iii) assigning a value of '0' if the two models are tied. In a further embodiment, assigning values to tournament Matrix 209 may include ranking 'wins' disproportionately to ties and losses, e.g., 3, 1, and 0, respectively. In another embodiment, assigning values to tournament Matrix 209 may include assigning equal scores to ties (in which the difference between the two rank aggregation scores is not sufficiently great). Methods of assigning tie values to rank aggregates that are not otherwise equal may include rounding and variation thresholds.

Some embodiments of the method may include creating multiple tournament matrices to assess the robustness of the model ranking created in the first tournament matrix 209 (described above). In one embodiment, the method may generate K tournament matrices in addition to the first tournament matrix. Each of the K tournament matrices may differ from the first tournament matrix in that the win-loss-tie score in each of its cells is determined without the input of one of the K evaluation criteria. For example, the tournament scores of the first of the K tournament matrices are determined without raw scores or ranking of the first evaluation criterion, and the tournament scores of the second of the K tournament matrices are determined without raw scores or ranking of the second evaluation criterion, and so on. Such an approach is referred to as leave-one-out cross validation (LOOCV).

After the tournament scores of each of the additional K tournament matrices have been tallied (using tallying methods that are consistent with those of the first tournament matrix), variation in the rankings among the K tournament matrices may be assessed with various measures of variability. Low variation among the rankings of the respective tournament matrices is indicative of a robust ranking. Higher variation among the rankings of the respective tournament matrices may be indicative of some evaluation criteria having disproportionate influence on the initial result meriting further analysis. Embodiments that compare variation in the ranking outputs given small changes in the evaluation criteria, e.g. using LOOCV, may ensure that model ranking results are robust.

In one embodiment, once values have been assigned to tournament matrix 209, tallying module 211 may tally the results of all model-by-model pairs in tournament matrix 209. In one example embodiment, a simple tallying method may be to add all the tournament scores, e.g., a column or row, for each model and ranking the models according to the sum, e.g., high-to-low, or low-to-high, or depending on the scoring system. In another embodiment, tallying module 211 may multiply and weigh tournament scores as with the alternative embodiments described above (refer to weighted rank winner). For example, the highest (or lowest) ranked model may be determined as the best by the "votes" of the K model evaluation criteria. Embodiments that generate multiple tournament matrices may tally the tournament scores within each matrix using any of the methods described above provided that the tallying method remains consistent across all of the matrices.

FIG. 3C illustrates an example of tournament matrix 209 and a resulting tally. FIG. 3C may follow from the example illustrated in FIGS. 3A and 3B. In one embodiment, since both the rows and columns may represent the models being compared, tournament matrix 209 may have dimensions of 3 by 3. In this ranking system, a lower rank may correspond to greater model performance. Thus, models with a lower aggregate rank score (from rank matrix 207) may be assigned the "winner" tournament score. In this example embodiment, a "winner" tournament score is 1 and a "loser" score is 0. Since there are no ties among different models, the tie score is not addressed. In tournament matrix 209, the focal model, e.g., model J, in each pair is the model corresponding to a row. Thus, the tally for a particular model may be the tally of its corresponding row, not the column associated with the model (columns may correspond to model K). For positions in tournament matrix 209 in which a model is compared to itself, i.e., J=K, there is no score, as indicated by an "x" in position $c_{jj}$. The tally for each of the models may be listed in the right-most column (labeled "Total"). In this example embodiment, the tally may be the sum of the tournament scores in a row. For example, model 2 had the highest aggregate tournament score, therefore performed best among the four ranking criteria.

In one example embodiment, there may be ten models, e.g., M=1, . . . 10, wherein three models may be random forests fit using different search parameters, three models may be XGBoost models fit with different parameters, and four more models may be XGBoost models fit with additional data. The columns of the matrices may be labeled rf.1, rf.2, rf3, xgb1.1, xgb1.2, xgb1.3 and xbg2.1, xbg2.2, xbg2.3, xbg2.4. In one embodiment, there may be three global evaluation criteria: AUROC, AUPRC, and calibration error. These criteria may also be evaluations of subsets of the model population, by score threshold or demographic groups. For example, evaluation criteria of true positive rate (TPR), and false negative rate (FNR) at the top 1%, top 2%, and top 5% of scores for the race\ethnicity groups African American, Asian, Hispanic, White, and other (these are the groups typically available in de-identified data). Thus, there may be three global performance measures and around thirty threshold-based measures for race/ethnicity. Additionally, model run times may be considered (all rf models are faster than xbg1 and xgb1 is faster than xgb2, but all rf and xgb are tied to similar models) and complex interpretability may also be considered (rf are more interpretable than any xbg and xgb1 is more interpretable than xgb2). In this example embodiment, the raw score matrix may have dimensions of 35 evaluation rows by 10 model columns. The allowance for random variation in the evaluation of the scores allows evaluation of TPR (or other measure) at a specific cut-off threshold to use bootstrapping or other methods to determine statistical significance of the differences between two models. After executing the steps of this disclosure, data processing module 203 may possess an auditable trail of the decision to promote one of the models for deployment, or that a small set of models may be equally considered winners.

Referring back to FIG. 2, in one embodiment, user interface module 213 may enable a presentation of a graphical user interface (GUI) in UE 103 to assist modeling team 101 in building a model. For example, user interface module 213 may employ various application programming interfaces (APIs) or other function calls corresponding to application 105 on UE 103, thus enabling the display of graphics primitives such as icons, menus, buttons, data entry fields, etc., to assist modeling team 101 in building a model. In another embodiment, user interface module 213 may cause interfacing of guidance information, e.g., one or more annotations, audio messages, video messages, or a combination thereof, to assist review/audit team 101 in reviewing the model. In one example embodiment, user interface module 213 may comprise a variety of interfaces, for example, interfaces for data input and output devices, referred to as I/O devices, storage devices, and the like, for displaying the best model, e.g., a least biased model, a best performing model. Still further, user interface module 213 may be configured to operate in connection with augmented reality (AR) processing techniques, wherein various applications, graphic elements, and features may interact.

The above presented modules and components of evaluation platform 111 may be implemented in hardware, firmware, software, or a combination thereof. Though depicted as a separate entity in FIG. 2, it is contemplated that evaluation platform 111 may be implemented for direct operation by respective UE 103. As such, evaluation platform 111 may generate direct signal inputs by way of the operating system of the UE 103. In another embodiment, one or more of the modules 201-213 may be implemented for operation by respective UEs, as evaluation platform 111, or a combination thereof. The various executions presented herein contemplate any and all arrangements and models.

Figure 4:
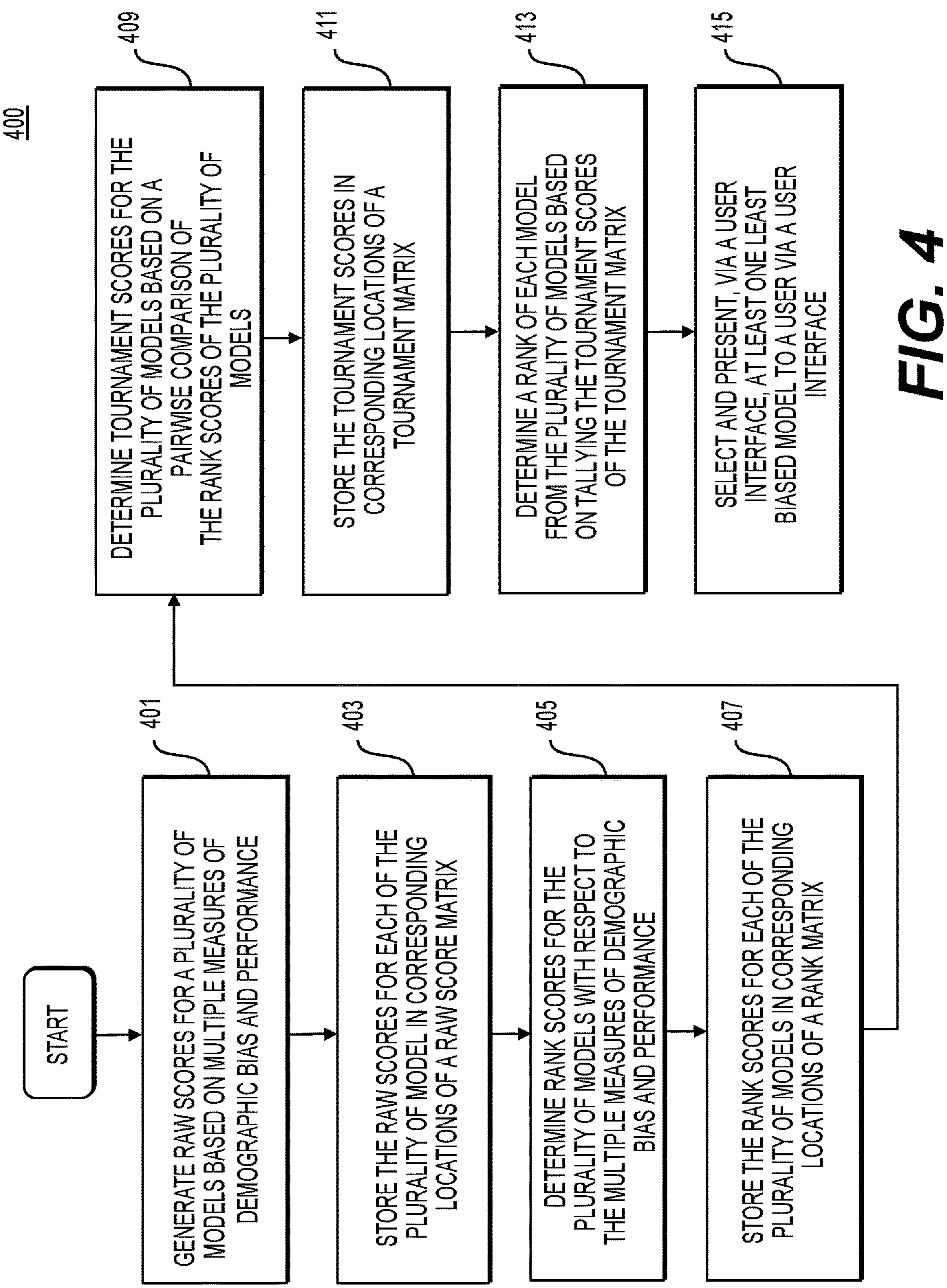
FIG. 4 is a flowchart of a process for comparing and evaluating a plurality of models according to multiple measures of demographic bias and performance for selecting a least biased model, according to aspects of the disclosure.
Figure 6:
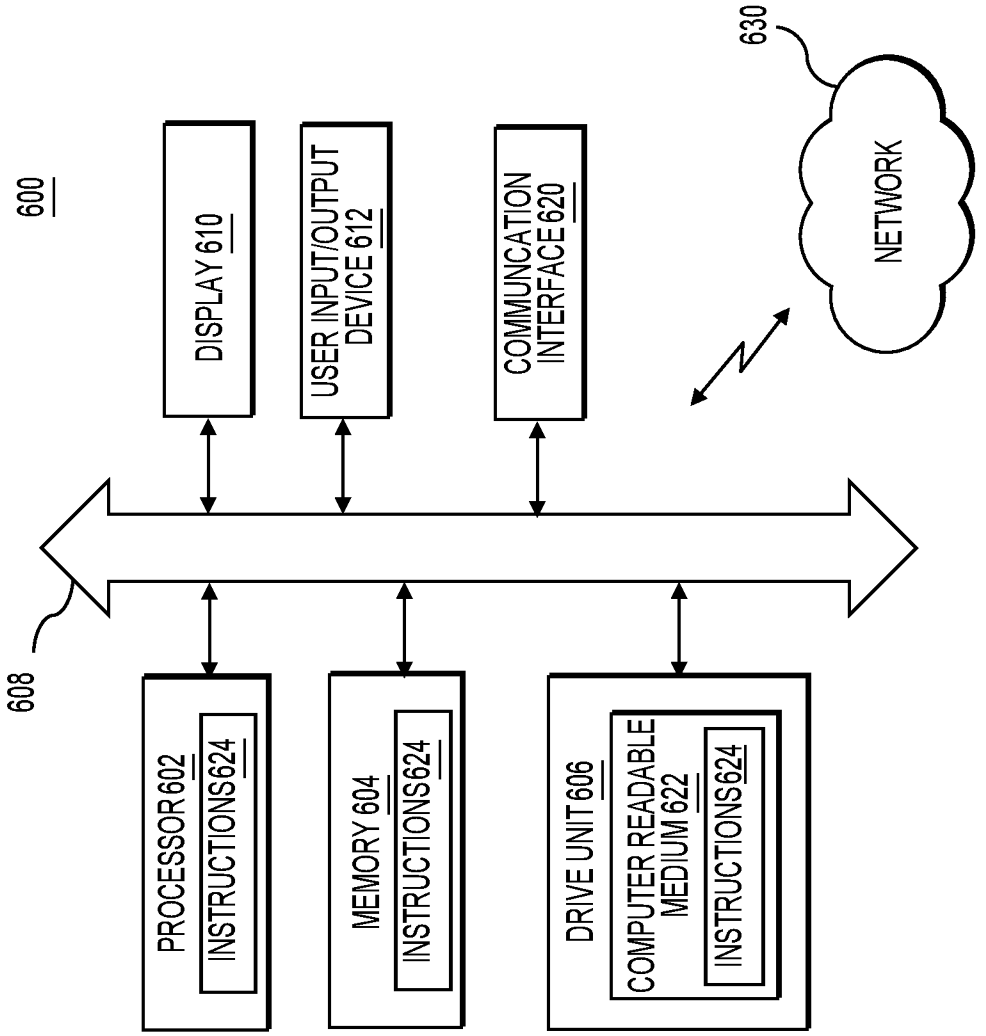
FIG. 6 illustrates an implementation of a general computer system that may execute techniques presented herein.

FIG. 4 is a flowchart of a process for comparing a plurality of models by evaluating their performances on multiple measures of bias for selecting one model over other candidates, according to one example embodiment. In various embodiments, evaluation platform 111 and/or any of modules 201-219 may perform one or more portions of process 400 and may be implemented in, for instance, a chip set including a processor and a memory as shown in FIG. 6. As such, evaluation platform 111 and/or any of modules 201-219 may provide means for accomplishing various parts of process 400, as well as means for accomplishing embodiments of other processes described herein in conjunction with other components of system 100. Although process 400 is illustrated and described as a sequence of steps, it is contemplated that various embodiments of process 400 may be performed in any order or combination and need not include all of the illustrated steps.

In step 401, evaluation platform 111 may generate raw scores for the plurality of models based on multiple measures of demographic bias and performance (e.g., model performance), i.e., evaluation criteria. In one embodiment, demographic bias indicates bias for subsets of individuals based on demographic data. Demographic data may refer to socioeconomic information expressed statistically, including age, gender, race, employment, education, income, marital status, household, location, and any other characteristics relating to a particular sector of a population. As an example, demographic data may reflect bias for subsets of individuals based on the type of health insurance plans. In one embodiment, the model performance includes any non-bias measures, such as computational complexity. In one embodiment, each of the raw scores may be associated with a corresponding model of the plurality of models and a corresponding measure of the multiple measures of demographic bias and performance. In one embodiment, the multiple measures of demographic bias and performance may include an objective measure to evaluate a precision, a recall, or a ratio of true positives to false positives of each of the plurality of models. In another embodiment, the multiple measures of demographic bias and performance may include a subjective quantitative measure to evaluate a transparency of each of the plurality of models.

In step 403, evaluation platform 111 may store the raw scores for each of the plurality of models in corresponding locations of a raw score matrix. In one embodiment, each of the locations of the raw score matrix may be associated with a corresponding measure of the multiple measures of demographic bias and performance and a corresponding model of the plurality of models. In one embodiment, at least one location of the plurality of locations of the raw score matrix may include a plurality of raw scores. The plurality of raw scores may be measures of at least two of: a central tendency yielded by the measure of demographic bias associated with the at least one location, a variation of the plurality of raw scores yielded by the measure of demographic bias associated with the at least one location, or skewness or kurtosis of the measure of demographic bias associated with the at least one location.

In step 405, evaluation platform 111 may determine rank scores for the plurality of models with respect to the multiple measures of demographic bias and performance. The determining may be based on comparing the raw scores of the plurality models in each of the multiple measures of demographic bias and performance. In one embodiment, determining the rank scores for the plurality of models may include determining ties between the raw scores of the plurality of models based, at least in part, on a proximity threshold, an overlap threshold, or a combination thereof. The proximity threshold may include rounding the raw scores to a set number of digits to indicate ties. The overlap threshold may include determining the raw scores differs by less than a given fraction or a multiple of a measure of a variation for the raw scores of at least one measure of demographic bias and performance to indicate ties. In one embodiment, evaluation platform 111 may assign an equivalent ranking to two or more models with tied raw scores. In one embodiment, at least one of the rank scores may indicate an aggregation of rank orders, and the aggregation of the rank orders may include adding and/or multiplying the rank scores associated with a corresponding model of the plurality of models. In one embodiment, a rank score in at least one measure of demographic bias and performance may be weighed more than other measures of demographic bias and performance, and the weighting is a co-efficient in an additive aggregation or an exponent in a multiplicative aggregation.

In step 407, evaluation platform 111 may store the rank scores for each of the plurality of models in corresponding locations of a rank matrix. In one embodiment, each of the locations of the rank matrix may be associated with a corresponding measure of the multiple measures of demographic bias and performance and a corresponding model of the plurality of models.

In step 409, evaluation platform 111 may determine tournament scores for the plurality of models based on performing a pairwise comparison of the rank scores of the plurality of models. In one embodiment, determining the tournament scores for the plurality of models may include determining the rank score of a first model of the plurality of models is equal to, lower than, or higher than the rank score of a second model of the plurality of models. A statistical comparison may be utilized between random variable of the first model and the second model. The evaluation platform 111 may assign the tournament score to the first model and the second model based, at least in part, on the determination. In one embodiment, evaluation platform 111 may generate a plurality of tournament matrices to assess robustness of the ranking of the plurality of models. In one embodiment, the tournament scores of each of the plurality of tournament matrices may be determined exclusive of the raw scores or the rank scores of the multiple measures of demographic bias and performance.

In step 411, evaluation platform 111 may store the tournament scores in corresponding locations of a tournament matrix. In one embodiment, each of the locations of the tournament matrix may be associated with a corresponding model of the plurality of models and may represent a win, a loss, or a draw against another model of the plurality of models. In one embodiment, evaluation platform 111 may determine a variation in the ranking of the plurality of models by the plurality of tournament matrices. In one embodiment, a low variation in the ranking of the plurality of models by the plurality of tournament matrices may indicate a robust ranking. In another embodiment, a higher variation in the ranking of the plurality of models by the plurality of tournament matrices may indicate at least one measure of demographic bias and performance with disproportionate influence on an initial result.

In step 413, evaluation platform 111 may determine a rank for each of the plurality of models based on tallying the tournament scores of the tournament matrix. In one embodiment, evaluation platform 111, via tallying module 211, may implement a simple tallying method by adding all the tournament scores, e.g., a column or row, for each model and ranking the models according to the sum or depending on the scoring system. In another embodiment, tallying module 211 may multiply and weigh tournament scores as with the alternative embodiments described herein. Embodiments that generate multiple tournament matrices may tally the tournament scores within each matrix using any of the methods described above provided that the tallying method remains consistent across all of the matrices.

In step 415, evaluation platform 111 may select at least one least biased model, and may present the selected model in a user interface of UE 103. In one embodiment, evaluation platform 111 may, automatically, per schedule, or upon a user input/validation, deploy at least one least biased model to end users, and the end users may apply the model for prediction using new data. For example, evaluation platform 111, with or without user input/validation received via user interface module 213, may deploy the selected model that may determine the current health condition of an individual, and may transmit a notification message to a physician or healthcare professionals upon determining at least one individual is at a health risk and requires immediate medical attention. End users may carry out the deployment effort to understand the actions that need to be undertaken to make use of the model. Also, evaluation platform 111 may generate and transmit notifications (e.g., emails, text messages, phone calls, or the like) to user(s), indicating that at least one least biased model has been determined and/or the results of the evaluation have been determined. Such notifications may contain an indication of such least biased model or results of the evaluation. In another embodiment, evaluation platform 111, via user interface module 213, may generate a list of evaluated models, wherein the evaluated models may be and/or ranked based on their scores. Evaluation platform 111 may identify at least one model as the best model, e.g., a least biased model, and may recommend the usage of this best model. On the other hand, evaluation platform 111 may prevent end users from using or deploying models determined to be inferior during evaluation, e.g., evaluation platform 111 may block access to such lowly-graded models or provide indications as to why certain model should not be used or deployed. In a further embodiment, evaluation platform 111, via user interface module 213, may generate a presentation of one or more matrices for review by the review/audit team 101, for them to understand how the models have been evaluated and ranked.

Figure 5:
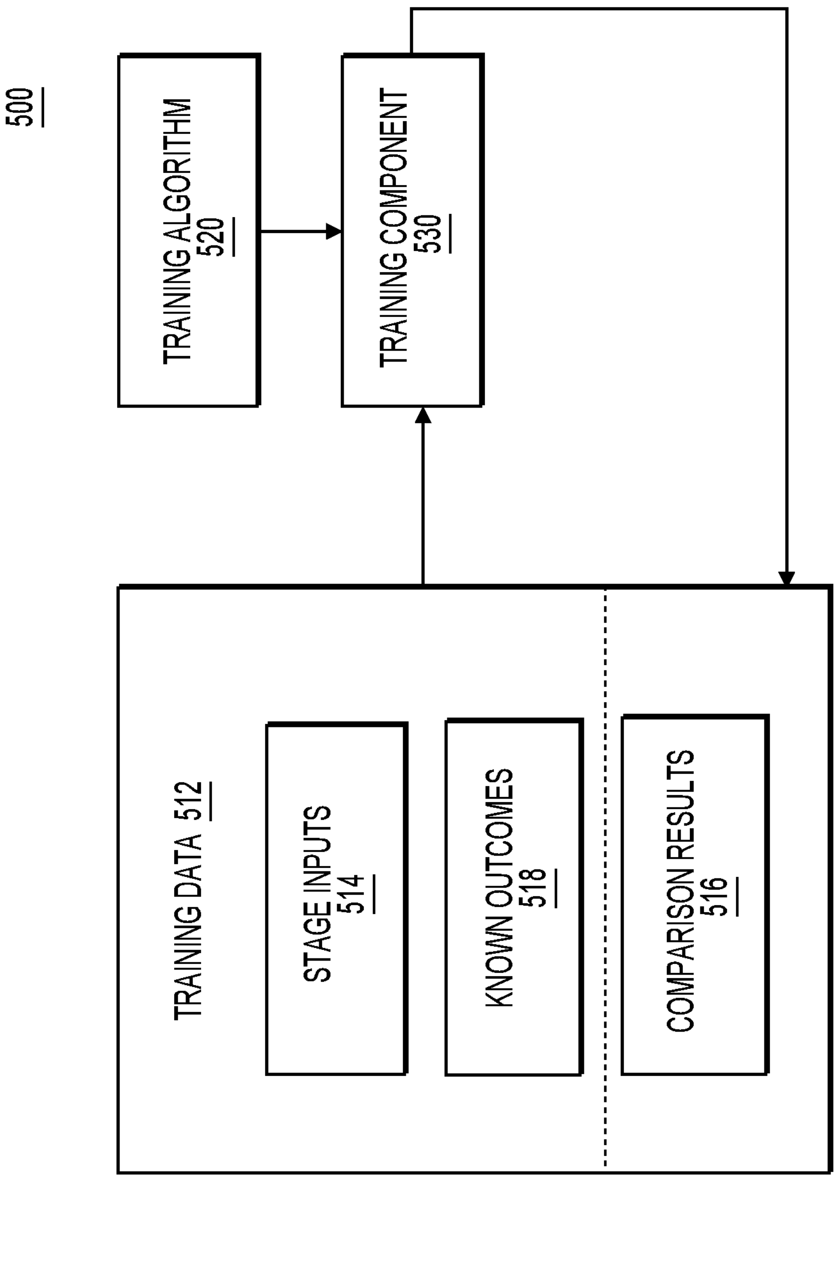
FIG. 5 shows an example machine learning training flow chart.

A given machine learning model may be trained using the data flow 500 of FIG. 5. Training data 512 may include one or more of stage inputs 514 and known outcomes 518 related to the machine learning model to be trained. The stage inputs 514 may be from any applicable source including text, visual representations, data, values, comparisons, stage outputs.

The known outcomes 518 may be included for the machine learning models generated based on supervised or semi-supervised training. An unsupervised machine learning model may not be trained using known outcomes 518. Known outcomes 518 may include known or desired outputs for future inputs similar to or in the same category as stage inputs 514 that do not have corresponding known outputs.

The training data 512 and a training algorithm 520, e.g., one or more of the modules implemented using the machine learning model and/or may be used to train the machine learning model, may be provided to a training component 530 that may apply the training data 512 to the training algorithm 520 to generate the machine learning model. According to an implementation, the training component 530 may be provided comparison results 516 that compare a previous output of the corresponding machine learning model to apply the previous result to re-train the machine learning model. The comparison results 516 may be used by training component 530 to update the corresponding machine learning model. The training algorithm 520 may utilize machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, and/or discriminative models such as Decision Forests and maximum margin methods, or the like.

The machine learning model used herein may be trained and/or used by adjusting one or more weights and/or one or more layers of the machine learning model. For example, during training, a given weight may be adjusted (e.g., increased, decreased, removed) based on training data or input data. Similarly, a layer may be updated, added, or removed based on training data/and or input data. The resulting outputs may be adjusted based on the adjusted weights and/or layers.

In general, any process or operation discussed in this disclosure that is understood to be computer-implementable, such as the process illustrated in FIGS. 3A-3B and 4 may be performed by one or more processors of a computer system as described herein. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices. One or more processors of a computer system may be included in a single computing device or distributed among a plurality of computing devices. One or more processors of a computer system may be connected to a data storage device. A memory of the computer system may include the respective memory of each computing device of the plurality of computing devices.

FIG. 6 illustrates an implementation of a general computer system that may execute techniques presented herein. The computer system 600 can include a set of instructions that can be executed to cause the computer system 600 to perform any one or more of the methods or computer based functions disclosed herein. The computer system 600 may operate as a standalone device or may be connected, e.g., using a network, to other computer systems or peripheral devices.

Unless specifically stated otherwise, as apparent from the following discussions, it is appreciated that throughout the specification, discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

In a networked deployment, the computer system 600 may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 600 can be implemented using electronic devices that provide voice, video, or data communication. Further, while a computer system 600 is illustrated as a single system, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. The processor 602 may be a component in a variety of systems. For example, the processor 602 may be part of a standard personal computer or a workstation. The processor 602 may be one or more general processors, digital signal processors, application specific integrated circuits, field programmable gate arrays, servers, networks, digital circuits, analog circuits, combinations thereof, or other now known or later developed devices for analyzing and processing data. The processor 602 may implement a software program, such as code generated manually (i.e., programmed).

The computer system 600 may include a memory 604 that can communicate via a bus 608. The memory 604 may be a main memory, a static memory, or a dynamic memory. The memory 604 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 604 includes a cache or random-access memory for the processor 602. In alternative implementations, the memory 604 is separate from the processor 602, such as a cache memory of a processor, the system memory, or other memory. The memory 604 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 604 is operable to store instructions executable by the processor 602. The functions, acts or tasks illustrated in the figures or described herein may be performed by the processor 602 executing the instructions stored in the memory 604. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 600 may further include a display 610, such as a liquid crystal display (LCD), an organic light emitting diode (OLED), a flat panel display, a solid-state display, a cathode ray tube (CRT), a projector, a printer or other now known or later developed display device for outputting determined information. The display 610 may act as an interface for the user to see the functioning of the processor 602, or specifically as an interface with the software stored in the memory 604 or in the drive unit 606.

Additionally or alternatively, the computer system 600 may include an input/output device 612 configured to allow a user to interact with any of the components of computer system 600. The input/output device 612 may be a number pad, a keyboard, or a cursor control device, such as a mouse, or a joystick, touch screen display, remote control, or any other device operative to interact with the computer system 600.

The computer system 600 may also or alternatively include drive unit 606 implemented as a disk or optical drive. The drive unit 606 may include a computer-readable medium 622 in which one or more sets of instructions 624, e.g. software, can be embedded. Further, instructions 624 may embody one or more of the methods or logic as described herein. The instructions 624 may reside completely or partially within the memory 604 and/or within the processor 602 during execution by the computer system 600. The memory 604 and the processor 602 also may include computer-readable media as discussed above.

In some systems, a computer-readable medium 622 includes instructions 624 or receives and executes instructions 624 responsive to a propagated signal so that a device connected to a network 630 can communicate voice, video, audio, images, or any other data over the network 630. Further, the instructions 624 may be transmitted or received over the network 630 via a communication port or interface 620, and/or using a bus 608. The communication port or interface 620 may be a part of the processor 602 or may be a separate component. The communication port or interface 620 may be created in software or may be a physical connection in hardware. The communication port or interface 620 may be configured to connect with a network 630, external media, the display 610, or any other components in computer system 600, or combinations thereof. The connection with the network 630 may be a physical connection, such as a wired Ethernet connection or may be established wirelessly as discussed below. Likewise, the additional connections with other components of the computer system 600 may be physical connections or may be established wirelessly. The network 630 may alternatively be directly connected to a bus 608.

While the computer-readable medium 622 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 622 may be non-transitory, and may be tangible.

The computer-readable medium 622 can include a solid-state memory such as a memory card or other package that houses one or more non-volatile read-only memories. The computer-readable medium 622 can be a random-access memory or other volatile re-writable memory. Additionally or alternatively, the computer-readable medium 622 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 600 may be connected to a network 630. The network 630 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 630 may include wide area networks (WAN), such as the Internet, local area networks (LAN), campus area networks, metropolitan area networks, a direct connection such as through a Universal Serial Bus (USB) port, or any other networks that may allow for data communication. The network 630 may be configured to couple one computing device to another computing device to enable communication of data between the devices. The network 630 may generally be enabled to employ any form of machine-readable media for communicating information from one device to another. The network 630 may include communication methods by which information may travel between computing devices. The network 630 may be divided into sub-networks. The sub-networks may allow access to all of the other components connected thereto or the sub-networks may restrict access between the components. The network 630 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for comparing a plurality of models, comprising:

generating, by one or more processors, raw scores for the plurality of models based on multiple measures of demographic bias and performance, wherein each of the raw scores is associated with a corresponding model of the plurality of models and a corresponding measure of the multiple measures of demographic bias and performance;

storing, by the one or more processors, the raw scores for each of the plurality of models in corresponding locations of a raw score matrix, wherein each of the locations of the raw score matrix is associated with a corresponding measure of the multiple measures of demographic bias and performance and a corresponding model of the plurality of models;

determining, by the one or more processors, rank scores for the plurality of models with respect to the multiple measures of demographic bias and performance, the determining based on comparing the raw scores of the plurality of models in each of the multiple measures of demographic bias and performance;

storing, by the one or more processors, the rank scores for each of the plurality of models in corresponding locations of a rank matrix, wherein each of the locations of the rank matrix is associated with a corresponding measure of the multiple measures of demographic bias and performance and a corresponding model of the plurality of models;

determining, by the one or more processors, comparative scores for the plurality of models based on a pairwise comparison of the rank scores of the plurality of models, wherein the pairwise comparison of the rank scores includes a statistical comparison of two random variables to select at least one model from the plurality of models;

storing, by the one or more processors, the comparative scores in corresponding locations of a comparative matrix, wherein each of the locations of the comparative matrix is associated with a corresponding model of the plurality of models and represents a win, a loss, or a draw against another model of the plurality of models, the comparative scores including a stored win representing a first model compared to a second model and a stored loss representing the first model compared to a third model, the comparative scores representing stored wins having a first shared value and the comparative scores representing stored losses having a second shared value;

determining, by the one or more processors, a rank for each of the plurality of models based on tallying the comparative scores of the comparative matrix and one or more of a model run time or complexity of interpretability of a model;

causing, by the one or more processors, to display a model associated with a first rank indicative of a least biased model to a user via a user interface based on the rank determined for each of the plurality of models; and causing, by the one or more processors, an automated deployment of the model associated with the first rank and prevention of deployment of at least one model associated with a subsequent rank indicative of a biased model.

2. The computer-implemented method of claim 1, wherein the multiple measures of demographic bias and performance include an objective measure to evaluate a precision, a recall, or a ratio of true positives to false positives of each of the plurality of models.

3. The computer-implemented method of claim 1, wherein the multiple measures of demographic bias and performance include a subjective quantitative measure to evaluate transparency of each of the plurality of models.

4. The computer-implemented method of claim 1, wherein at least one location of the plurality of locations of the raw score matrix includes a plurality of raw scores, and wherein the plurality of raw scores are measures of at least two of: a central tendency yielded by the measure of demographic bias and performance associated with the at least one location, a variation of the plurality of raw scores yielded by the measure of demographic bias and performance associated with the at least one location, or skewness or kurtosis of the measure of demographic bias and performance associated with the at least one location.

5. The computer-implemented method of claim 1, wherein determining the rank scores for the plurality of models further comprises:

determining ties between the raw scores of the plurality of models based, at least in part, on a proximity threshold, an overlap threshold, or a combination thereof, wherein the proximity threshold includes rounding the raw scores to a set number of digits to indicate ties, and wherein the overlap threshold includes determining the raw scores differs by less than a given fraction or a multiple of a measure of a variation for the raw scores of at least one measure of demographic bias and performance to indicate ties; and assigning an equivalent ranking to two or more models with tied raw scores.

6. The computer-implemented method of claim 1, wherein determining the comparative scores for the plurality of models further comprises:

determining the rank score of a first model of the plurality of models is equal to, lower than, or higher than the rank score of a second model of the plurality of models; and assigning the comparative score to the first model and the second model based, at least in part, on the determination.

7. The computer-implemented method of claim 1, wherein at least one of the rank scores indicates an aggregation of rank orders, and wherein the aggregation of the rank orders further comprises:

adding and/or multiplying the rank scores associated with a corresponding model of the plurality of models, wherein a rank score in at least one measure of demographic bias and performance is weighed more than other measures of demographic bias and performance, and wherein weighting is a co-efficient in an additive aggregation or an exponent in a multiplicative aggregation.

8. The computer-implemented method of claim 1, further comprising:

generating a plurality of comparative matrices to assess robustness of the ranking of the plurality of models, wherein the comparative scores of each of the plurality of comparative matrices are determined exclusive of the raw scores or the rank scores of the multiple measures of demographic bias and performance.

9. The computer-implemented method of claim 8, further comprising:

determining a variation in the ranking of the plurality of models by the plurality of comparative matrices, wherein a low variation in the ranking of the plurality of models by the plurality of comparative matrices indicate a robust ranking, and wherein a higher variation in the ranking of the plurality of models by the plurality of comparative matrices indicate at least one measure of demographic bias and performance with disproportionate influence on an initial result.

10. The computer-implemented method of claim 1, further comprising:

re-training, by the one or more processors, the plurality of models based on an output of the at least one least biased model, wherein the plurality of models are re-trained using supervised learning, and wherein the re-training includes adjusting one or more weights and/or one or more layers of the plurality of models.

11. A system for comparing a plurality of models, comprising:

one or more processors;

one or more non-transitory computer readable media storing instructions which, when executed by the one or more processors, cause the one or more processors to perform operations comprising:

generating raw scores for the plurality of models based on multiple measures of demographic bias and performance, wherein each of the raw scores is associated with a corresponding model of the plurality of models and a corresponding measure of the multiple measures of demographic bias and performance;

storing the raw scores for each of the plurality of models in corresponding locations of a raw score matrix, wherein each of the locations of the raw score matrix is associated with a corresponding measure of the multiple measures of demographic bias and performance and a corresponding model of the plurality of models;

determining rank scores for the plurality of models with respect to the multiple measures of demographic bias and performance, the determining based on comparing the raw scores of the plurality of models in each of the multiple measures of demographic bias and performance;

storing the rank scores for each of the plurality of models in corresponding locations of a rank matrix, wherein each of the locations of the rank matrix is associated with a corresponding measure of the multiple measures of demographic bias and performance and a corresponding model of the plurality of models;

determining comparative scores for the plurality of models based on a pairwise comparison of the rank scores of the plurality of models, wherein the pairwise comparison of the rank scores includes a statistical comparison of two random variables to select at least one model from the plurality of models;

storing the comparative scores in corresponding locations of a comparative matrix, wherein each of the locations of the comparative matrix is associated with a corresponding model of the plurality of models and represents a win, a loss, or a draw against another model of the plurality of models, the comparative scores including a stored win representing a first model compared to a second model and a stored loss representing the first model compared to a third model, the comparative scores representing stored wins having a first shared value and the comparative scores representing stored losses having a second shared value;

determining a rank for each of the plurality of models based on tallying the comparative scores of the comparative matrix and one or more of a model run time or complexity of interpretability of a model;

causing to display a model associated with a first rank indicative of a least biased model to a user via a user interface based on the rank determined for each of the plurality of models; and causing an automated deployment of the model associated with the first rank and prevention of deployment of at least one model associated with a subsequent rank indicative of a biased model.

12. The system of claim 11, wherein the multiple measures of demographic bias and performance include an objective measure to evaluate a precision, a recall, or a ratio of true positives to false positives of each of the plurality of models.

13. The system of claim 11, wherein the multiple measures of demographic bias and performance include a subjective quantitative measure to evaluate a transparency of each of the plurality of models.

14. The system of claim 11, wherein at least one location of the plurality of locations of the raw score matrix includes a plurality of raw scores, and wherein the plurality of raw scores are measures of at least two of: a central tendency yielded by the measure of demographic bias and performance associated with the at least one location, a variation of the plurality of raw scores yielded by the measure of demographic bias and performance associated with the at least one location, or skewness or kurtosis of the measure of demographic bias and performance associated with the at least one location.

15. The system of claim 11, wherein determining the rank scores for the plurality of models further comprises:

determining ties between the raw scores of the plurality of models based, at least in part, on a proximity threshold, an overlap threshold, or a combination thereof, wherein the proximity threshold includes rounding the raw scores to a set number of digits to indicate ties, and wherein the overlap threshold includes determining the raw scores differs by less than a given fraction or a multiple of a measure of a variation for the raw scores of at least one measure of demographic bias and performance to indicate ties; and assigning an equivalent ranking to two or more models with tied raw scores.

16. The system of claim 11, wherein determining the comparative scores for the plurality of models further comprises:

determining the rank score of a first model of the plurality of models is equal to, lower than, or higher than the rank score of a second model of the plurality of models; and assigning the comparative score to the first model and the second model based, at least in part, on the determination.

17. The system of claim 11, wherein at least one of the rank scores indicates an aggregation of rank orders, and wherein the aggregation of the rank orders further comprises:

adding and/or multiplying the rank scores associated with a corresponding model of the plurality of models, wherein a rank score in at least one measure of demographic bias and performance is weighed more than other measures of demographic bias and performance, and wherein weighting is a co-efficient in an additive aggregation or an exponent in a multiplicative aggregation.

18. One or more non-transitory computer readable media for comparing a plurality of models, the one or more non-transitory computer readable media storing instructions which, when executed by one or more processors, cause the one or more processors to perform operations comprising:

generating raw scores for the plurality of models based on multiple measures of demographic bias and performance, wherein each of the raw scores is associated with a corresponding model of the plurality of models and a corresponding measure of the multiple measures of demographic bias and performance;

storing the raw scores for each of the plurality of models in corresponding locations of a raw score matrix, wherein each of the locations of the raw score matrix is associated with a corresponding measure of the multiple measures of demographic bias and performance and a corresponding model of the plurality of models;

determining rank scores for the plurality of models with respect to the multiple measures of demographic bias and performance, the determining based on comparing the raw scores of the plurality of models in each of the multiple measures of demographic bias and performance;

storing the rank scores for each of the plurality of models in corresponding locations of a rank matrix, wherein each of the locations of the rank matrix is associated with a corresponding measure of the multiple measures of demographic bias and performance and a corresponding model of the plurality of models;

determining comparative scores for the plurality of models based on a pairwise comparison of the rank scores of the plurality of models, wherein the pairwise comparison of the rank scores includes a statistical comparison of two random variables to select at least one model from the plurality of models;

storing the comparative scores in corresponding locations of a comparative matrix, wherein each of the locations of the comparative matrix is associated with a corresponding model of the plurality of models and represents a win, a loss, or a draw against another model of the plurality of models, the comparative scores including a stored win representing a first model compared to a second model and a stored loss representing the first model compared to a third model, the comparative scores representing stored wins having a first shared value and the comparative scores representing stored losses having a second shared value;

determining a rank for each of the plurality of models based on tallying the comparative scores of the comparative matrix and one or more of a model run time or complexity of interpretability of a model;

causing to display a model associated with a first rank indicative of a least biased model to a user via a user interface based on the rank determined for each of the plurality of models; and causing an automated deployment of the model associated with the first rank and prevention of deployment of at least one model associated with a subsequent rank indicative of a biased model.

19. The one or more non-transitory computer readable media of claim 18, wherein the multiple measures of demographic bias and performance include an objective measure to evaluate a precision, a recall, or a ratio of true positives to false positives of each of the plurality of models, and a subjective quantitative measure to evaluate a transparency of each of the plurality of models.

20. The one or more non-transitory computer readable media of claim 18, wherein at least one location of the plurality of locations of the raw score matrix includes a plurality of raw scores, and wherein the plurality of raw scores are measures of at least two of: a central tendency yielded by the measure of demographic bias and performance associated with the at least one location, a variation of the plurality of raw scores yielded by the measure of demographic bias and performance associated with the at least one location, or skewness or kurtosis of the measure of demographic bias and performance associated with the at least one location.

* * * * *